April 8, 1930.　　　　　F. SLUSHER　　　　　1,753,973
TIRE BUILDING APPARATUS
Filed Feb. 6, 1929　　　2 Sheets-Sheet 1
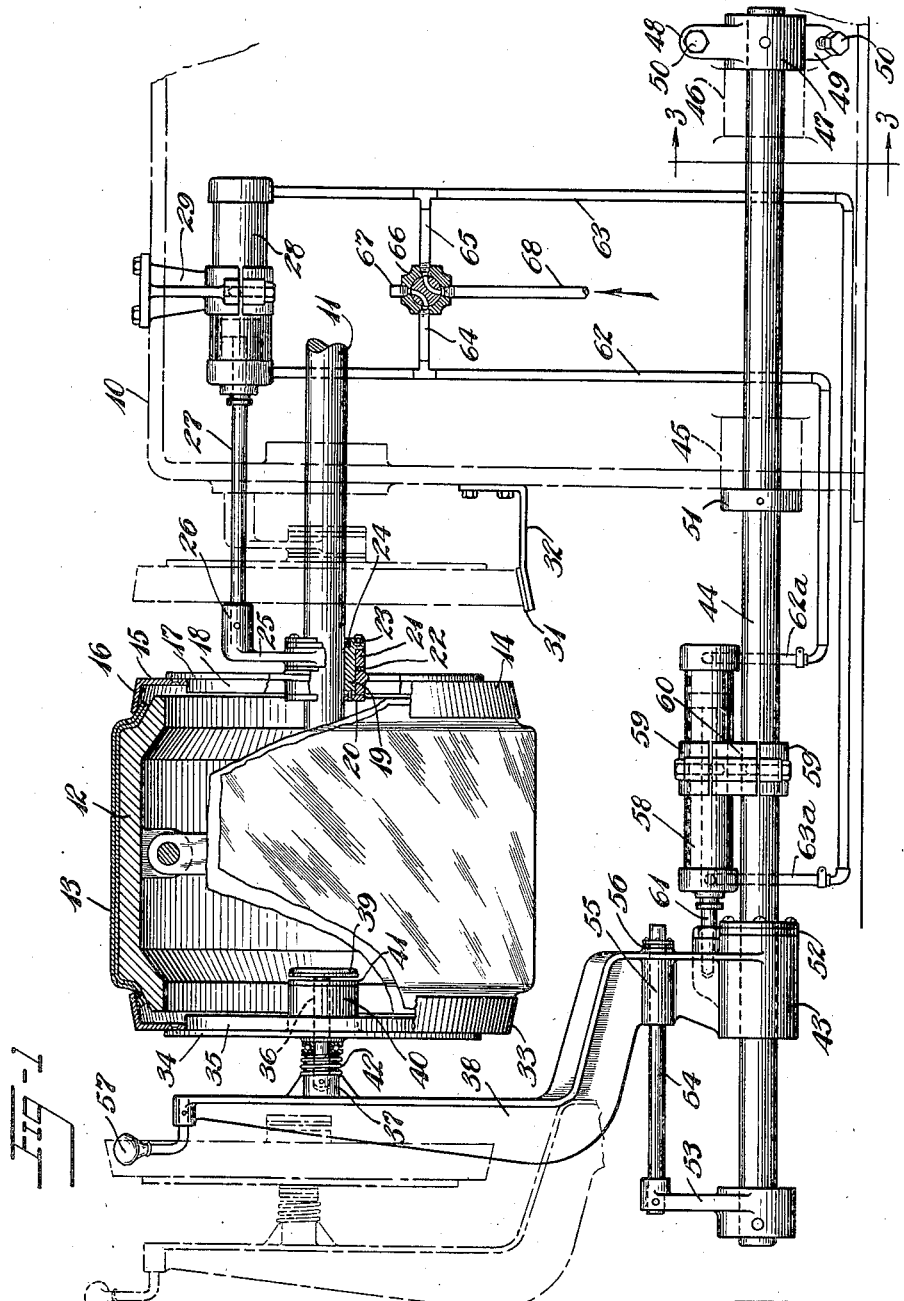
INVENTOR
Frank Slusher
By Eakin & Avery
Attys.

April 8, 1930.  F. SLUSHER  1,753,973
TIRE BUILDING APPARATUS
Filed Feb. 6, 1929   2 Sheets-Sheet 2
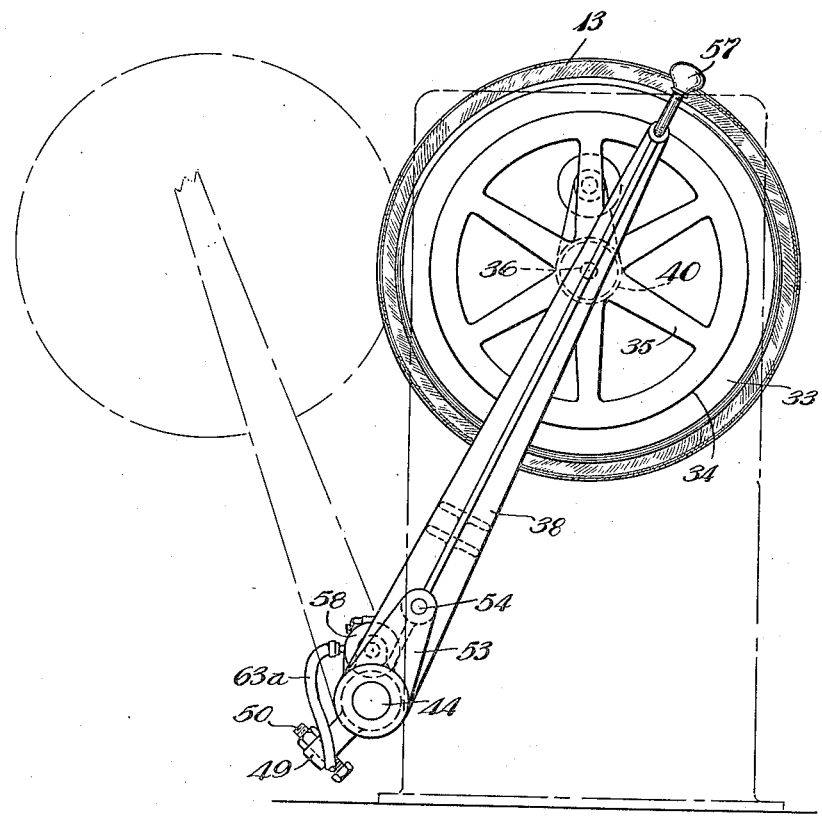
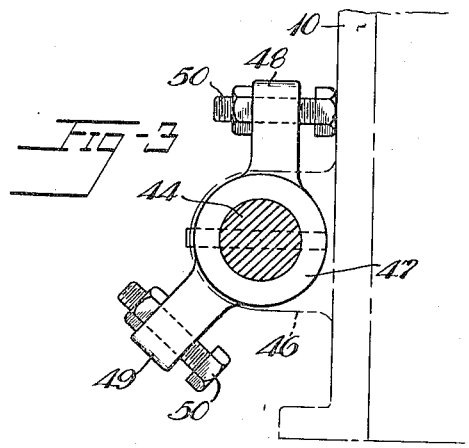
Inventor
Frank Slusher
By Eakin & Avery
Attys Patented Apr. 8, 1930

1,753,973

UNITED STATES PATENT OFFICE

FRANK SLUSHER, OF AKRON, OHIO, ASSIGNOR TO THE B. F. GOODRICH COMPANY, OF NEW YORK, N. Y., A CORPORATION OF NEW YORK

TIRE-BUILDING APPARATUS

Application filed February 6, 1929. Serial No. 337,910.

This invention relates to tire-building apparatus, and more especially it relates to mechanism for "setting" or positioning tire beads upon the respective marginal portions of a tire carcass during the manufacture thereof.

The chief object of the invention is to provide simple and easily operated mechanism for presenting bead-guiding or "bead-setting" structures to the opposite sides of a tire-building form, and for retracting them therefrom. A more specific object is to provide mechanism of the character mentioned which is so arranged as to permit easy access to the tire-building form during the construction of a tire thereon; and to permit the easy removal of a finished tire carcass from said form.

My invention is shown, for illustrative purpose only, in association with a shouldered drum for the building of flat band or pulley band tires. For facilitating the mounting of the under-bead carcass plies upon the drum, and for supporting and guiding the tire beads into engagement with said under-bead plies, I prefer to use a pair of rings similar to and for the same purpose as the bead-guiding structure shown in Patent No. 1,655,897 to Alois Feyzes, and I provide improved mechanism, operable at the will of the operator, for presenting said bead-guiding structures concurrently to the respective sides of the tire-building drum and for withdrawing them therefrom.

Of the accompanying drawings:

Fig. 1 is a front elevation of an embodiment of my invention in its preferred form, and the work thereon, parts being broken away and in section.

Fig. 2 is an end elevation of the apparatus as viewed from the left of Fig. 1.

Fig. 3 is a section on line 3—3 of Fig. 1.

Referring to the drawings, I show at 10 the housing of tire-building machine provided with the usual rotatable spindle 11 which carries upon its outer end a collapsible tire-building form herein shown as a shouldered drum 12. A partly-built tire carcass 13 comprising two under-bead fabric plies is shown mounted upon the drum 12.

Positioned between the housing 10 and the drum 12, concentric with the latter, is an annular bead-guiding structure 14 consisting of an annular, radially disposed sheet-metal portion 15 and an approximately cylindrical flange 16 extending from the outer margin of the said radial portion toward the drum 12 and adapted to overlie a shoulder portion thereof when in bead-placing position. The radial portion 15 of the ring 14 is suitably secured to a radial, circumferential flange 17 formed upon an annular wheel-like structure or spider 18, the hub portion of which is mounted upon a sleeve 19 journaled for axial and angular movement upon the spindle 11. A retaining plate 20 is secured to the inner end-face of said sleeve to retain the spider-hub on the sleeve.

Also mounted upon the sleeve 19, at the side of the spider-hub nearest the housing 10, is a shipper-bracket 21, which is loosely mounted to permit rotation of said sleeve. A spacing washer 22 is mounted upon the sleeve 19 between the spider-hub and the shipper-bracket, and an annular retaining plate 23 is mounted upon the end face of the sleeve, adjacent the shipper-bracket, to retain the latter thereon. A lubricating ring 24 comprising oil-impregnated fibrous material is mounted upon the spindle 11 between the shipper-bracket and the retaining plate 23.

The shipper-bracket 21 is formed with a radial arm 25 having an angular extension or socket 26 formed on the outer end thereof, parallel to the axis of the bracket 21, and mounted in said socket is the outer end of the piston rod 27 of a double-acting fluid-pressure-operated cylinder 28. The latter is mounted upon or within the housing 10 by means of a suitable supporting bracket 29.

The arrangement is such that the ring 14 may be moved forward or retracted upon the spindle 11 either while rotating or stationary, the forward position of the ring being determined by the position of the drum 12 with partly built tire carcass thereon, which the ring is adapted to engage, and the retracted position of the ring being determined by a boss 30, formed on the housing 10, which the socket 26 abuts at the extremity of its rearward movement.

If the ring 14 is withdrawn from the drum 12 while the latter is rotating, said ring will continue to rotate and a piece of frictional braking material 31 mounted upon an arm 32 secured to and extending from the housing 10 is provided for engaging the peripheral face of the ring at the extremity of its rearward movement to stop said rotation. This provision insures the operator against injury from accidental contact with the ring during the building of a tire.

Positioned at the opposite side of the drum 12 from the ring 14, is a bead-guiding ring 33 of the same form and construction as the ring 14, the radial portion of the ring 33 being secured to a circumferential, radial flange 34 formed on a spider 35 which is slidably journaled at its axis upon an elongated spindle 36 extending laterally from an annular boss 37 formed on an angularly and laterally movable arm 38. The free end of the spindle 36 is provided with a disc-like plate 39 and the adjacent end face of the hub-portion 40 of the spider 35 is provided with a facing of frictional material 41. A helical compression spring 42 is mounted upon the spindle 36 between the boss 37 and the spider-hub 40 normally to urge the latter and its friction facing 41 against the spindle-plate 39 to prevent rotation of the spider 35 and ring 33 for the reasons set forth with respect to the ring 14. The arrangement is such that when the ring 33 is carried into engagement with the adjacent shoulder of the drum 12 by the lateral movement of the arm 38, the limit of the arm's movement is not attained until after the ring engages the drum, so that the spindle plate 39 is carried out of engagement with the friction facing 41 of the spider-hub and the latter and the ring 33 are permitted to rotate with the drum 12 as is clearly shown in Fig. 1 of the drawings. When the ring 33 is withdrawn from the drum 12, the spring 42 functions in the manner hereinbefore described to stop rotation of said ring.

The arm 38 is formed with a hub portion 43 which is slidably mounted upon a horizontal rock-shaft 44 disposed parallel to the spindle 11 and journaled at one of its end portions in a pair of spaced apart journal-brackets 45, 46 formed upon the housing 10. The angular movement of the rock-shaft 44 is limited by a collar 47 secured thereon beside the journal bracket 46, said collar being formed with a pair of short radial arms 48, 49 disposed at a suitable angle to each other, and said arms being provided with respective adjustable bolts 50, 50 adapted to abut the housing 10 when the rock-shaft is angularly moved a determinate distance in either direction. In either position of rest the arm 38 is over center with relation to the rock shaft 44.

The collar 47 together with a collar 51 mounted upon the rock-shaft abutting the journal-bracket 45 prevent axial movement of the rock-shaft in its brackets. The arm-hub 43 has an oil-impregnated lubricating disc 52 clamped to one of its end faces to lubricate that portion of the rock-shaft 44 upon which it moves.

Mounted upon the free end-portion of the rock-shaft 44 is a lever-arm 53 having a guide-rod 54 mounted in its outer end, parallel to said rock-shaft and extending through an apertured boss 55 formed on the arm 38, and a lubricating disc 56 is clamped upon one face of the boss and surrounds the guide-rod 54 for lubricating the latter. The arrangement is such that the arm 38 may be manually moved to the inoperative, full-line position shown in Fig. 2 or to the inoperative position indicated by broken lines in the same figure, whenever the arm is in the retracted position, away from the drum 12, as indicated by its broken-line position in Fig. 1. The arm 38 is provided at its free end with a handle 57 which may be grasped by the operator for so swinging the arm 38, and the limits of said swinging movement are determined by the setting of the bolts 50 in the collar 47 hereinbefore described. In the operative position of the arm 38, the spindle 36 thereon is in axial alignment with the spindle 11 of the tire-building machine.

For moving the bead-guiding ring 33 toward and away from the drum 12 in an axial direction, a double-acting fluid-pressure-operated cylinder 58 is mounted upon the rock-shaft 44 by suitable clamps 59, 59 and a pillow block 60, and the piston rod 61 of the cylinder 58 is connected at its outer end to the hub portion 43 of the arm 38. The arrangement permits the cylinder 58 to move angularly with the rock-shaft 44 when the arm 38 is manually swung to either of its inoperative positions.

Preferably the cylinders 28, 58 operate concurrently to move their respective bead-guiding rings into and out of association with the work on the drum 12, and for so operating the cylinders an inlet and outlet fluid-conductor pipe 62 connects the front end of the cylinder 28 with the rear end of the cylinder 58, and a similar pipe 63 connects the rear end of the cylinder 28 with the front end of the cylinder 58. Adjoining the cylinder 58 the pipes 62, 63 are provided with respective flexible portions 62$^a$, 63$^a$ to permit lateral movement of said cylinder. The pipes 62, 63 are connected by pipes 64, 65 respectively to a four-way valve 66 provided with an exhaust port 67, and an inlet pipe 68 from a source of supply of fluid under pressure. The arrangement is such that pressure fluid may be directed into either of the pipes 64, 65 to actuate the cylinders 28, 58 in the desired direction while the other pipe exhausts fluid from the discharge ends of said cylinders.

The bead-guiding rings 14, 33 are utilized in the manufacture of tire casings in the same manner and for the same purpose as the bead-guiding structure of the aforementioned patent to Alois Feyzes, Patent No. 1,655,897. Said rings are concurrently presented to and withdrawn from the drum 12 by a turn of the valve 67, and the ring 33 is manually moved to the inoperative broken-line position shown in Fig. 2 at the completion of the tire-building operation to permit the finished tire to be removed from the collapsed drum 12 by withdrawing it, in an axial direction, from the adjacent end of the drum. When in contact with the drum 12 or the work thereon, the rings 14, 33 are driven thereby because of the frictional engagement of their contacting parts, and there is no relative rotary movement of the drum and rings while they are so engaged.

When the rings 14, 33 are in their retracted positions the operator has easy access to the drum 12 to perform various operations upon a tire thereon, and is in no danger of being cut by rotating rings.

My invention is susceptible of modification within the scope of the appended claims.

I claim:

1. Tire-building apparatus comprising a rotatable tire-building form, a bead-guiding ring normally supported at a position offset from the axis thereof, and means for moving said ring from such position into association with said form whereby it is rotated by said form.

2. Tire-building apparatus comprising an annular rotatable tire-building form, a bead-guiding structure normally supported at a position offset from the axis thereof, and means for moving the ring in its own plane, transversely of the axis of the form, to bring the ring into axial alignment with the form.

3. Tire-building apparatus as defined in claim 2 including means for moving the ring into association with the form after it has been aligned therewith.

4. Tire-building apparatus comprising an annular rotatable tire-building form, a bead-guiding ring mounted at one side thereof, and means for moving the ring in an arcuate course transversely of the said form to bring the latter and the ring into axial alignment.

5. Tire-building apparatus as defined in claim 4 including means for moving the ring into association with the form after it has been axially aligned therewith.

6. Tire-building apparatus comprising a rotatable tire-building form, a rotatable bead-guiding structure at one side thereof adapted to be rotated by association with said form, means for moving said structure into and out of association with said form, and braking means for stopping the rotation of said bead-guiding structure.

7. Tire-building apparatus as defined in claim 6 in which the braking means is so constructed and arranged as normally to be operative when the form and bead-guiding structure are out of association with each other, and to be held in inoperative position by the pressure of said structure against said form.

8. Tire-building apparatus comprising a rotatable tire-building form, a pivoted arm at one side thereof movable in a plane transverse to the axis of the form, and a bead-guiding structure mounted upon said arm.

9. Tire-building apparatus as defined in claim 8 in which the arm is so pivoted that its respective movements transversely of the axis of the form carry its free end over center with relation to the vertical plane of its own axis.

10. Tire-building apparatus comprising a rotatable tire-building form, an arm mounted at one side of said form, a rotatable bead-guiding ring mounted on said arm, and means for moving the arm laterally to carry said ring into association with said form.

11. Tire-building apparatus comprising a rotatable tire-building form, an arm mounted at one side thereof, a spindle on said arm, a bead-guiding ring journaled on said spindle, automatically operative braking means interposed between said ring and spindle, and means for moving the arm to carry the bead-guiding ring into association with the tire-building form whereby said ring is rotated with said form.

12. Tire-building apparatus as defined in claim 11 in which the braking means is so constructed and arranged as normally to be operative when the tire-building form and bead-guiding ring are not associated with each other, and to be held in inoperative position by the pressure of said ring against said form.

13. Tire-building apparatus comprising a rotatable tire-building form, a rock-shaft parallel to the axis of said form, an arm mounted upon said rock-shaft and movable in a plane transverse to the axis of said form, a bead-guiding structure mounted upon said arm, and means for limiting the angular movement of said rock-shaft.

14. Tire-building apparatus as defined in claim 13 in which the arm is mounted for sliding movement axially of the rock-shaft.

15. Tire-building apparatus comprising a rotatable tire-building form, a rock-shaft mounted parallel to the axis of said form, an arm slidably mounted upon said rock-shaft but restrained against angular movement with relation thereto, a bead-guiding structure on said arm, and means for moving the arm axially of the rock-shaft to carry the bead-guiding structure into and out of association with said form.

16. Tire-building apparatus as defined in claim 15 in which the arm-moving means is mounted upon the rock-shaft.

17. Tire-building apparatus comprising a rotatable tire-building form, a rock-shaft journaled parallel to said form, an arm mounted for sliding movement axially upon said rock-shaft, a bead-guiding structure on said arm, a fluid pressure cylinder for moving the arm axially of the rock-shaft, and means for limiting the angular movement of said rock-shaft.

18. Tire-building apparatus comprising a rotatable tire-building form, respective bead-guiding rings at the opposite sides thereof, respective supporting members upon which said rings are journaled, means individual to said supporting members for moving them toward and away from the tire-building form, and means for concurrently actuating said individual ring-moving means.

19. Tire-building apparatus comprising a tire-building form, a rotatable spindle supporting the same, a sleeve slidably mounted upon said spindle, a bead-guiding ring journaled upon said sleeve concentric with said form, and means for moving the sleeve axially of the spindle to present the ring to the form and to withdraw it therefrom.

20. Tire-building apparatus as defined in claim 19 including braking means operable upon the bead-guiding ring to stop its rotation after it is withdrawn from the rotating form.

In witness whereof I have hereunto set my hand this 2nd day of February, 1929.

FRANK SLUSHER.